(12) United States Patent
Kawasumi (10) Patent No.: US 10,270,107 B2
(45) Date of Patent: Apr. 23, 2019

(54) FUEL CELL AND MANUFACTURING METHOD FOR FUEL CELL

(71) Applicant: TOYOTA JIDOSHA KABUSHIKI KAISHA, Toyota-shi, Aichi-ken (JP)

(72) Inventor: Akito Kawasumi, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 195 days.

(21) Appl. No.: 15/364,751

(22) Filed: Nov. 30, 2016

(65) Prior Publication Data
US 2017/0162882 A1 Jun. 8, 2017

(30) Foreign Application Priority Data
Dec. 2, 2015 (JP) ................... 2015-236150

(51) Int. Cl.
*H01M 8/0273* (2016.01)
*H01M 8/0284* (2016.01)
(Continued)

(52) U.S. Cl.
CPC ....... *H01M 8/0273* (2013.01); *H01M 8/0284* (2013.01); *H01M 8/1004* (2013.01);
(Continued)

(58) Field of Classification Search
CPC ............. H01M 8/0273; H01M 8/0284; H01M 8/0297; H01M 8/1004; H01M 8/1007; H01M 2008/1095; Y02P 70/56
See application file for complete search history.

(56) References Cited

U.S. PATENT DOCUMENTS 6,387,557 B1 * 5/2002 Krasij ............... H01M 2/08
429/465
6,805,986 B2 * 10/2004 Kuroki ............ H01M 8/0271
429/431
(Continued)

FOREIGN PATENT DOCUMENTS

JP 2009-299903 A 12/2009
JP 2014-053118 A 3/2014
(Continued)

OTHER PUBLICATIONS https://omnexus.specialchem.com/polymer-properties/properties/coefficient-of-linear-thermal-expansion (date unknown).*
(Continued)

*Primary Examiner* — Gregg Cantelmo
(74) *Attorney, Agent, or Firm* — Hunton Andrews Kurth LLP (57) ABSTRACT

A fuel cell includes; a membrane electrode gas diffusion layer assembly, first and second separators sandwiching the membrane electrode gas diffusion layer assembly; a sealing member having a resin-made base material, a first adhesive layer bonding one surface of the base material to the first separator, and a second adhesive layer bonding the other surface of the base material to the second separator; and an adhering portion bonding an inner periphery of the one surface of the base material to the periphery of the electrolyte membrane. The first and second adhesive layers are separated from the adhering portion, no other adhesive component than an adhering portion is provided in the base material between the inner periphery of the base material and the first and second adhesive layers, and a linear expansion coefficient of the base material is smaller than any of those of the first and second adhesive layers.

6 Claims, 7 Drawing Sheets (51) Int. Cl.
*H01M 8/0297* (2016.01)
*H01M 8/1004* (2016.01)
*H01M 8/1007* (2016.01)
*H01M 8/1018* (2016.01)

(52) U.S. Cl.
CPC ........ H01M 8/1007 (2016.02); *H01M 8/0297* (2013.01); *H01M 2008/1095* (2013.01); *Y02P 70/56* (2015.11)

(56) References Cited

U.S. PATENT DOCUMENTS

| 7,794,864 B2 * | 9/2010 | Morimoto | H01M 8/0273 |
| | | | 429/460 |
| 2012/0034542 A1 | 2/2012 | Martin et al. | |

FOREIGN PATENT DOCUMENTS

| JP | 2014-067689 A | 4/2014 |
| JP | 2015-115131 A | 6/2015 |
| JP | 2015-125926 A | 7/2015 |
| JP | 2015-144112 A | 8/2015 |
| JP | 2015-195189 A | 11/2015 |
| WO | 2014/017235 A1 | 1/2014 |

OTHER PUBLICATIONS https://www.engineeringtoolbox.com/linear-expansion-coefficients-d_95.html (date unknown).* http://www.crosslinktech.com/articles/glass-transition-temperature-and-cte.html (date unknown).*

* cited by examiner

FUEL CELL AND MANUFACTURING METHOD FOR FUEL CELL

INCORPORATION BY REFERENCE

The disclosure of Japanese Patent Application No. 2015-236150 filed on Dec. 2, 2015 including the specification, drawings and abstract is incorporated herein by reference in its entirety.

BACKGROUND

1. Technical Field

The present disclosure relates to a fuel cell and a manufacturing method for a fuel cell.

2. Description of Related Art

A fuel cell is known, which includes a membrane electrode gas diffusion layer assembly provided with a step portion so that a cathode-side peripheral area of an electrolyte membrane is exposed, a pair of separators that sandwich the membrane electrode gas diffusion layer assembly, and a sealing member that is sandwiched between the pair of separators and bonded to the peripheral area of the electrolyte membrane. On both sides of a resin base material of the sealing member, adhesive layers are provided, respectively, and the adhesive layers are bonded to the pair of separators. Also, one of the adhesive layers is bonded to the electrolyte membrane (for example, see Japanese Patent Application Publication No. 2014-67689 (JP 2014-67689 A).

For the adhesive layers of the sealing member, for example, thermoplastic resin or thermosetting resin is used, and the adhesive layers are thermocompression bonded to the separators. In a case where the adhesive layers are made of thermoplastic resin, a part of the adhesive layer, which is bonded to neither the separator nor the electrolyte membrane, shrinks at the time of cooling after the thermocompression bonding, and tension could be applied to the electrolyte membrane. In a case where the adhesive layer is thermosetting resin, the part of the adhesive layer shrinks at the time of cooling after thermosetting, and a similar problem could happen. Also, in a case where such a fuel cell stack is placed under a low-temperature environment, the part of the adhesive layer shrinks, and a similar problem could occur.

SUMMARY

The disclosure provides a fuel cell that restrains tension applied to an electrolyte membrane, and a manufacturing method for the fuel cell.

A fuel cell according to the first aspect of the disclosure includes a membrane electrode gas diffusion layer assembly, first and second separators, a sealing member, and an adhering portion. The membrane electrode gas diffusion layer assembly has an electrolyte membrane, a first catalyst layer disposed on one surface of the electrolyte membrane, a second catalyst layer disposed on the other surface of the electrolyte membrane so that a peripheral area of the electrolyte membrane is exposed, a first gas diffusion layer joined to the first catalyst layer, and a second gas diffusion layer joined to the second catalyst layer so that the peripheral area is exposed. The first and second separators sandwich the membrane electrode gas diffusion layer assembly. The sealing member has a resin-made and frame-shaped base material, a first adhesive layer that bonds one surface of the base material to the first separator, and a second adhesive layer that bonds the other surface of the base material to the second separator. The adhering portion bonds an inner periphery side of the one surface of the base material to the peripheral area of the electrolyte membrane. The first and second adhesive layers are separated from the adhering portion in a plane direction of the electrolyte membrane and disposed on an outside of the electrolyte membrane in the plane direction of the electrolyte membrane. No other adhesive component than the adhering portion is provided in the base material between an inner periphery of the base material and the first and second adhesive layers in the plane direction of the electrolyte membrane. A linear expansion coefficient of the base material is smaller than any of those of the first and second adhesive layers.

The inner periphery side of the one surface of the base material is bonded to the peripheral area of the electrolyte membrane by the adhering portion. The first and second adhesive layers are separated from the adhering portion and disposed on an outside of the electrolyte membrane in the plane direction of the electrolyte membrane. No other adhesive component than the adhering portion is provided in the base material between the inner periphery of the base material and the first and second adhesive layers in the plane direction of the electrolyte membrane. Therefore, the base material is restrained from shrinking along with shrinkage of the first and second adhesive layers. The base material is bonded to the peripheral area of the electrolyte membrane. However, since the linear expansion coefficient of the base material is smaller than any of those of the first and second adhesive layers, shrinkage of the base material itself is restrained. Thus, tension applied to the electrolyte membrane along with shrinkage of the base material is restrained.

The linear expansion coefficient of the base material may be $57 \times 10^{-6}$/K or smaller.

The first and second adhesive layers may be thermoplastic resin.

Further, a manufacturing method for a fuel cell according to the second aspect of the disclosure includes: preparing a membrane electrode gas diffusion layer assembly having an electrolyte membrane, a first catalyst layer disposed on one surface of the electrolyte membrane, a second catalyst layer disposed on the other surface of the electrolyte membrane so that a peripheral area of the electrolyte membrane is exposed, a first gas diffusion layer joined to the first catalyst layer, and a second gas diffusion layer joined to the second catalyst layer so that the peripheral area is exposed; preparing first and second separators; manufacturing a sealing member having a resin-made and frame-shaped base material, and first and second adhesive layers provided on one surface and the other surface of the base material, respectively, in which the first and second adhesive layers are larger than the electrolyte membrane in a plane direction of the base material, no adhesive component is provided in the base material between an inner periphery of the base material and the first and second adhesive layers in the plane direction of the base material, and a linear expansion coefficient of the base material is smaller than any of those of the first and second adhesive layers; bonding the inner periphery side of the one surface of the base material to the peripheral area of the electrolyte membrane by using an adhesive so that the first and second adhesive layers are separated from the electrolyte membrane in the plane direction of the electrolyte membrane; and bonding the membrane electrode gas diffusion layer assembly and the sealing member to the first and second separators by using the first and second adhesive layers, respectively, while causing the first and second separators to sandwich the membrane electrode gas diffusion layer assembly and the sealing member.

When manufacturing the sealing member, the base material having an elongated and the first and second adhesive layers having elongated shapes, respectively, may be prepared, an opening larger than the electrolyte membrane may be formed in each of the first and second adhesive layers, the first and second adhesive layers may be attached to the one surface and the other surface of the base material, respectively, so that positions of the openings match each other, the base material may be cut together with the first and second adhesive layers into a rectangular shape at a position on an outer side of the openings, a central portion of the base material may be cut at a position inwardly apart from the peripheries of the openings into a shape that is smaller than an outer circumference of the peripheral area of the electrolyte membrane and larger than the second catalyst layer, and a hole for a manifold may be formed on the outer side of the openings.

It is possible to provide a fuel cell and a manufacturing method for the fuel cell, in which tension applied to the electrolyte membrane is restrained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
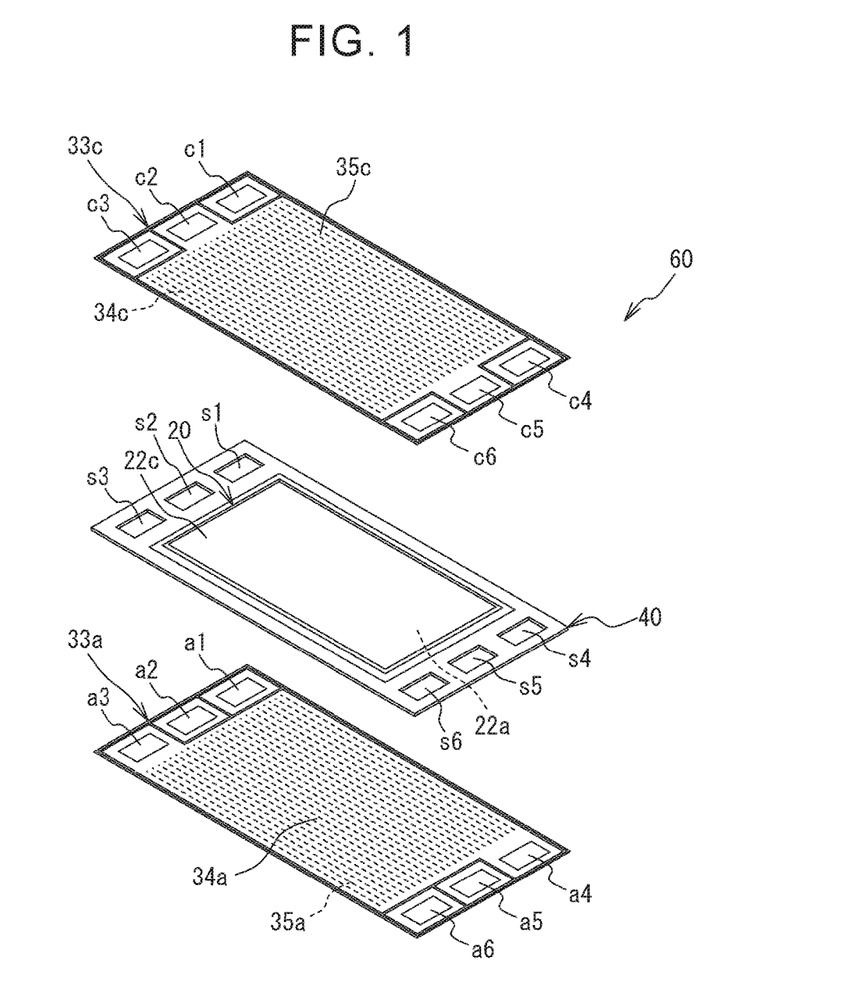
FIG. 1 is an exploded perspective view of a single cell, which is a fuel cell.

FIG. 1 is an exploded perspective view of a single cell 60, which is a fuel cell. A fuel cell stack is structured by stacking a plurality of single cells 60. The fuel cell stack is a polymer electrolyte fuel cell stack that generates electricity as fuel gas (for example, hydrogen) and oxidant gas (for example, oxygen) are supplied as reactant gas. The single cell 60 includes a membrane electrode gas diffusion layer assembly 20 (herein below, referred to as MEGA), and an anode-side separator 33a and a cathode-side separator 33c (herein below, referred to as separators) that sandwich the MEGA 20. The MEGA 20 has an anode-side gas diffusion layer 22a and a cathode-side gas diffusion layer 22c (herein after, referred to as diffusion layers). A generally frame-shaped and insulating sealing member 40, details of which will be given later, is provided in a peripheral area of the MEGA 20.

Holes a1 to a3 are formed on one of two short sides of the separator 33a, and holes a4 to a6 are formed on the other side. Similarly, holes c1 to c3 are formed on one of two short sides of the separator 33c, and holes c4 to c6 are formed on the other side. Holes s1 to s3 are formed on one of two short sides of the sealing member, and holes s4 to s6 are formed on the other side. The holes a1, s1, and c1 communicate with each other and define a cathode inlet manifold. Similarly, the holes a2, s2, and c2 define a refrigerant outlet manifold, the holes a3, s3, and c3 define an anode outlet manifold, the holes a4, s4, and c4 define an anode inlet manifold, the holes a5, s5, and c5 define a refrigerant inlet manifold, and the holes a6, s6, and c6 define a cathode outlet manifold.

On a surface of the separator 33a, which faces the MEGA 20, the anode inlet manifold and the anode outlet manifold communicate with each other, thus forming an anode flow passage 34a where fuel gas flows. On a surface of the separator 33c, which faces the MEGA 20, the cathode inlet manifold and the cathode outlet manifold communicate with each other, thus forming a cathode flow passage 34c where oxidant gas flows. On the surface of the separator 33a on the other side of the anode flow passage 34a, and the surface of the separator 33c on the other side of the cathode flow passage 34c, refrigerant inlet manifolds and refrigerant outlet manifolds communicate with each other, thus forming refrigerant flow passages 35a and 35c, respectively, where refrigerant flows.

Figure 2:
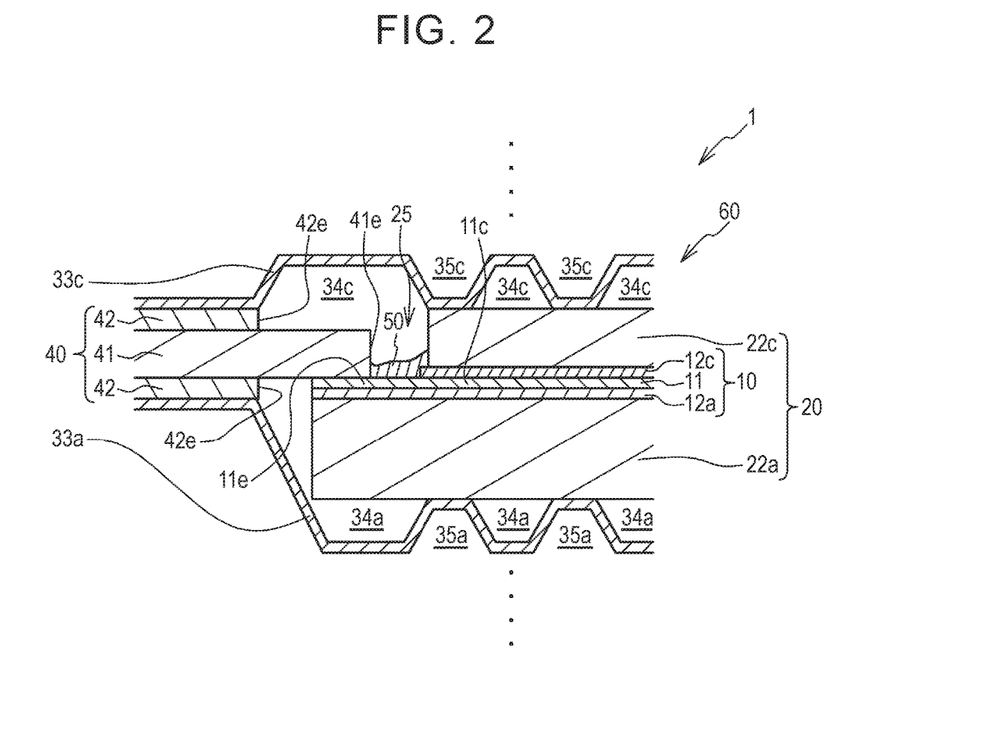
FIG. 2 is a partial sectional view of the single cell of a fuel cell stack.

FIG. 2 is a partial sectional view of the single cell 60 of a fuel cell stack 1. FIG. 2 shows only one single cell 60 and the rest of the single cells are not shown. The MEGA 20 includes the foregoing diffusion layers 22a and 22c, and a membrane electrode assembly (herein after, referred to as MEA) 10. The MEA 10 includes a generally-rectangular electrolyte membrane 11, and an anode-side catalyst layer 12a and a cathode-side catalyst layer 12c (herein after, referred to as catalyst layers) that are formed on one surface (the lower surface in FIG. 2) of the electrolyte membrane 11 and the other surface (the upper surface in FIG. 2), respectively. The electrolyte membrane 11 is a solid polymer membrane having good proton conductivity in a wet state, such as a fluorine-based ion exchange membrane. The electrolyte membrane 11 has a peripheral area 11e, and a central area 11c surrounded by the peripheral area 11e.

The catalyst layer 12a is formed so that its position generally aligns with the end portion of the electrolyte membrane 11. This means that the catalyst layer 12a is formed on the generally entire surface of the electrolyte membrane 11 on one side including the peripheral area 11e and the central area 11c of the electrolyte membrane 11. The catalyst layer 12c is formed in the central area 11c of the other surface the electrolyte membrane 11, and is not formed in the peripheral area 11e. The catalyst layers 12a and 12c are examples of the first and second catalyst layers, respectively. The catalyst layers 12a and 12c are formed by applying, for example, a carbon carrier that carries platinum (Pt), and ionomer having proton conductivity, on the electrolyte membrane 11.

The diffusion layers 22a and 22c are joined to the catalyst layers 12a and 12c, respectively. The diffusion layers 22a and 22c are formed of a material having gas permeability and conductivity such as a porous fiber base material like carbon fiber and graphite fiber. The diffusion layer 22a is an example of the first gas diffusion layer joined to the catalyst layer 12a. The diffusion layer 22c is provided so that its end portion is located on a slightly inner side of or generally aligned with the end portion of the catalyst layer 12c. Therefore, the diffusion layer 22c is provided so as to overlap the central area 11c of the electrolyte membrane 11 through the catalyst layer 12c but not to overlap the peripheral area 11e. Thus, the diffusion layer 22c is provided so that the peripheral area 11e is exposed. Therefore, as shown in FIG. 2, a step portion 25 is formed in the peripheral portion of the MEGA 20. The diffusion layer 22c is an example of the second gas diffusion layer joined to the catalyst layer 12c so that the peripheral area 11e is exposed.

Similarly, the diffusion layer 22a is provided so that its end portion is generally aligned with the end portion of the catalyst layer 12a. However, as stated earlier, the catalyst layer 12a is formed on the generally entire surface of the electrolyte membrane 11 on one side. This means that the diffusion layer 22a is provided so as to overlap not only the central area 11c but also the peripheral area 11e through the catalyst layer 12a. Since the diffusion layer 22a is provided so as to overlap the peripheral area 11e, the MEA 10 is supported in a stable manner. Further, the diffusion layers 22a and 22c are joined to the catalyst layers 12a and 12c, respectively, and provided so as not to be in direct contact with electrolyte membrane 11. Therefore, for example, fiber of the diffusion layer 22a or 22c is prevented from being in direct contact with and damaging the electrolyte membrane 11. Also, since the diffusion layer 22c is thinner than the diffusion layer 22a, an increase in diffusion resistance of cathode gas is suppressed, thereby restraining deterioration of power generation efficiency of the fuel cell stack 1. In the example, the diffusion layer 22c is formed to be thinner than the diffusion layer 22a but the disclosure is not limited to this.

The sealing member 40 is a member for preventing cross leakage and electrical short circuit between catalyst electrodes, has a frame shape and is made of resin. The sealing member 40 includes a frame-shaped and resin-made base material 41 and adhesive layers 42 provided on both surfaces of the base material 41, respectively. The adhesive layer 42 provided on one surface (the lower surface in FIG. 2) of the base material 41 is bonded to the separator 33a. The adhesive layer 42 provided on the other surface (the upper surface in FIG. 2) of the base material 41 is bonded to the separator 33c. Thus, the sealing member 40 is sandwiched between the pair of separators 33a and 33c. Similarly to the base material 41, the adhesive layers 42 are provided in a frame shape on both surfaces of the base material 41. The adhesive layer 42 provided on one surface of the base material 41 is an example of the first adhesive layer, and the adhesive layer 42 provided on the other surface of the base material 41 is an example of the second adhesive layer.

As shown in FIG. 2, the two adhesive layers 42 are provided only in portions that are bonded to the separators 33a and 33c, respectively, and are separated from the electrolyte membrane 11 to the outer side in the plane direction of the electrolyte membrane 11. Therefore, inner peripheries 42e of the adhesive layers 42 are positioned on the outer side of an inner periphery 41e of the base material 41. The inner periphery 41e side of the base material 41 is bonded to the peripheral area 11e of the electrolyte membrane 11 via an adhesive 50. The adhesive 50 may be present between one surface (the lower surface in FIG. 2) of the base material 41 on the inner periphery 41e side and the peripheral area 11e of the electrolyte membrane 11. The adhesive 50 is, for example, thermosetting resin, but may also be ultraviolet curable resin. A state of the adhesive 50 before application may be, for example, any of gel-like, jelly-like, and cream-like states. The adhesive 50 is an example of the adhering portion that bonds one surface of the base material 41 on the inner periphery 41e side to the peripheral area 11e of the electrolyte membrane 11.

No other adhesive component than the adhesive 50 is provided on the base material 41 between the inner periphery 41e of the base material 41 and the adhesive layers 42 in the plane direction of the electrolyte membrane 11. In more detail, on one surface of the base material 41, the adhesive layer 42 is separated from the adhesive 50 in the plane direction of the electrolyte membrane 11 and provided on the outer side of the electrolyte membrane 11 in the plane direction of the electrolyte membrane 11, and no adhesive component is provided between the adhesive layer 42 and the adhesive 50. On the other surface of the base material 41, the adhesive layer 42 is separated from the adhesive 50 in the plane direction of the electrolyte membrane 11 and provided on the outer side of the electrolyte membrane 11 in the plane direction of the electrolyte membrane 11, and no adhesive component is provided between the adhesive layer 42 and the adhesive 50. This means that no other adhesive component than the adhesive 50 is provided on the base material 41 around the peripheral area 11e of the electrolyte membrane 11.

The base material 41 is formed of a material whose structure does not change under a temperature condition at the time of thermocompression bonding in a later-described step for manufacturing the single cell 60. Specifically, the material of the base material 41 is, for example, PEN (polyethylene naphthalate), PES (polyethersulfone), PET (polyethylene terephthalate) or the like. In order to bond the base material 41 and the separators 33a and 33c to each other and ensure sealability, the adhesive layers 42 have characters that they have high adhesiveness to other substances, soften under a temperature condition at the time of thermocompression bonding, and have a lower viscosity and melting point than those of the base material 41. To be more specific, the adhesive layers 42 are polyester-based or modified olefin-based thermoplastic resin, but may also be thermosetting resin that is modified epoxy resin.

The separators 33a and 33c are an example of the pair of separators that sandwich the MEGA 20, and also sandwich the sealing member 40. The separators 33a and 33c are formed of a material having gas barrier properties and conductivity, and may be formed of pressed stainless steel, a sheet-like member formed of metal such as titanium and titanium alloy, or a carbon member such as dense carbon.

Figure 3:
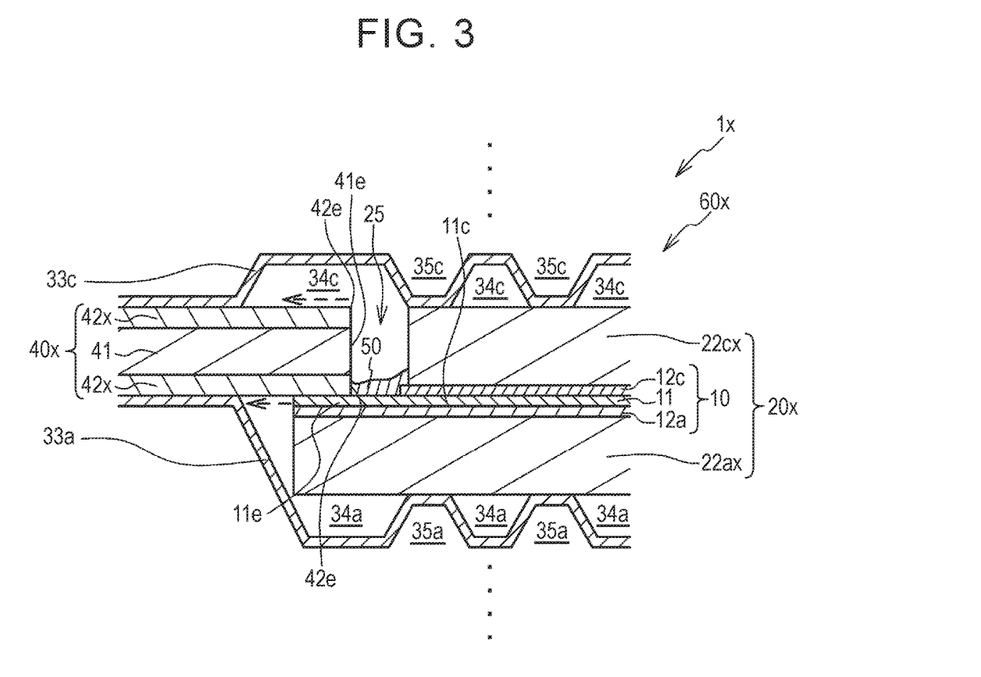
FIG. 3 is an explanatory view of a comparative example.

Next, a problem that could occur in a comparative example, which is different from the example, is explained. FIG. 3 is an explanatory view of the comparative example. In the comparative example, the same reference numerals will be used for the same components as those of the example in order to avoid duplicated explanation. In a single cell 60x of a fuel cell stack 1x in the comparative example, diffusion layers 22ax and 22cx of a MEGA 20x have the same thickness. Further, on both surface sides of a base material 41 of a sealing member 40x, inner peripheries 42e of adhesive layers 42x and an inner periphery 41e of the base material 41 are aligned with each other. The adhesive layer 42x provided on one surface (the lower surface in FIG. 3) of the base material 41 is bonded to an electrolyte membrane 11 via an adhesive 50. Similarly to the adhesive layer 42, the adhesive layer 42x is thermoplastic resin.

In this fuel cell stack 1x, after the sealing member 40x is bonded to the peripheral area 11e of the electrolyte membrane 11 by the adhesive 50, separators 33a and 33c and the sealing member 40x are bonded to each other by thermocompression bonding. Therefore, at the time of cooling after the thermocompression bonding of the separators 33a and 33c and the sealing member 40x, parts of the adhesive layers 42x, which are not bonded to any of the separators 33a and 33c and the adhesive 50, shrink, and the electrolyte membrane 11 could be pulled to the outer side in the parallel direction of the electrolyte membrane 11, or the arrow direction shown in FIG. 3. Even in a case where the adhesive layers 42x are thermosetting resin, the adhesive layers 42x could shrink at the time of cooling after thermal curing, and a similar problem could occur. Further, in a case where the fuel cell stack 1x is placed under a low-temperature environment, even if the adhesive layers 42x are any of thermoplastic resin and thermosetting resin, a similar problem could occur. As stated so far, due to the tension applied to the electrolyte membrane 11, the electrolyte membrane 11 can be damaged.

Thus, as stated earlier, in the fuel cell stack 1 according to the example, no other adhesive component than the adhesive 50 is provided on the base material 41 around the peripheral area 11e of the electrolyte membrane 11. Therefore, even if the adhesive layers 42 shrink, the base material 41 is restrained from shrinking along with the adhesive layers 42. Since shrinkage of the base material 41 is restrained, tension applied to the electrolyte membrane 11, which is bonded to the base material 41, is also restrained.

In addition, for the base material 41, a material having a lower linear expansion coefficient than that of the adhesive layers 42 is used so that the base material 41 itself does not shrink easily. For example, in a case where the adhesive layers 42 are polyester-based thermoplastic resin, its linear expansion coefficient is $200 \times 10^{-6}$/K. In a case where the adhesive layers 42 are modified olefin-based thermoplastic resin, its linear expansion coefficient is $300 \times 10^{-6}$/K. In a case where the adhesive layers 42 are thermosetting resin, which is modified epoxy resin, its linear expansion coefficient is $180 \times 10^{6}$/K. Meanwhile, in a case where the base material 41 is PEN, its linear expansion coefficient is $18 \times 10^{-6}$/K, in a case of PES, the linear expansion coefficient is $57 \times 10^{-6}$/K, and in a case of PET, the linear expansion coefficient is $15 \times 10^{-6}$/K. As stated above, because the material that does not shrink easily is used as a material for the base material 41, shrinkage of the base material 41 is also restrained under a low-temperature environment. The material for the base material 41 is not limited to those state above, and is preferably a material that makes the linear expansion coefficient of the base material 41 at $57 \times 10^{\times 6}$/K or lower. As stated so far, since the base material 41 itself is restrained from shrinking, tension applied to the electrolyte membrane 11 is restrained.

Figure 4:
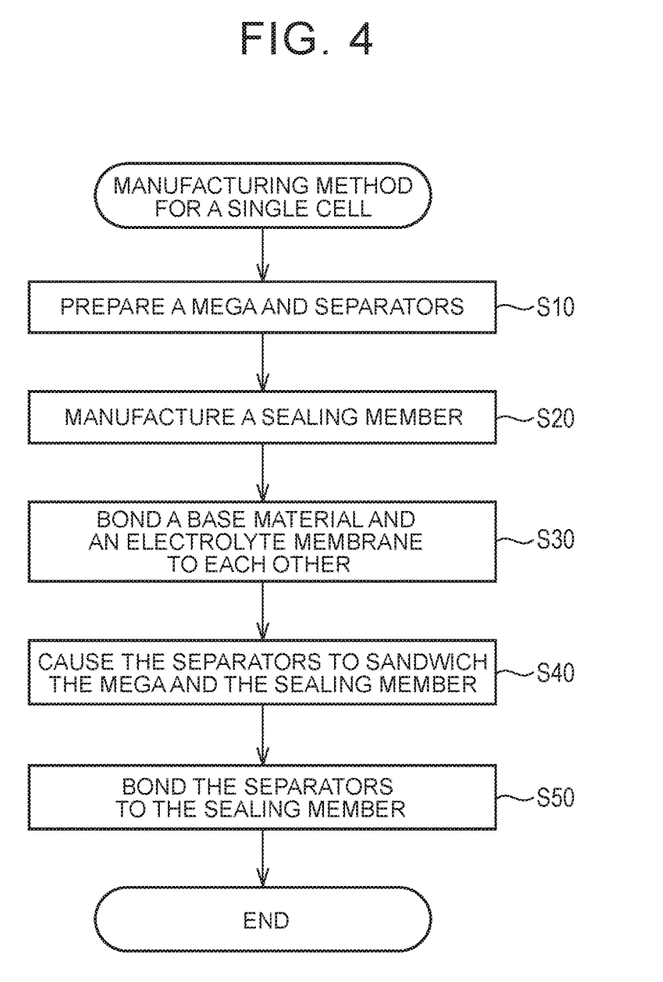
FIG. 4 is a flowchart showing a manufacturing method for the single cell.

Next, a manufacturing method for the single cell 60 is explained. FIG. 4 is a flowchart showing a manufacturing method for the single cell 60. First of all, the MEGA 20 and the separators 33a and 33c are prepared (step S10), and then the sealing member 40 is manufactured (step S20). Next, the adhesive 50 is applied by using, for example, a dispenser, on the peripheral area 11e of the electrolyte membrane 11, the peripheral area 11e being exposed in the step portion 25. The inner periphery 41e side of the base material 41 is bonded to the peripheral area 11e of the electrolyte membrane 11 so that the adhesive layers 42 are separated from the electrolyte membrane 11 in the plane direction of the electrolyte membrane 11 (step S30). In a case where the adhesive 50 is ultraviolet curable resin, the adhesive 50 is cured by ultraviolet ray irradiation. In a case where the adhesive 50 is thermosetting resin, the adhesive 50 is heated instead of ultraviolet ray irradiation. In the case where the adhesive 50 is ultraviolet curable resin, the adhesive 50 is cured in a short time, and manufacturing cost is reduced. Also, when the base material 41 and the electrolyte membrane 11 are bonded to each other, a given clearance is made so that the inner periphery 41e of the base material 41 is not in contact with the diffusion layer 22c.

Next, the separators 33a and 33c are arranged on the sides of the diffusion layers 22a and 22c, respectively, the separators 33a and 33c are caused to sandwich the MEGA 20 and the sealing member 40 (step S40), and the separators 33a and 33c and the adhesive layers 42 are bonded to each other by thermocompression bonding (step S50). By doing so, it is possible to obtain the single cell 60 in which the outer circumference of the MEGA 20 is sealed by the sealing member 40. By stacking the single cells 60, it is possible to manufacture the fuel cell stack 1. The order of steps S10 and S20 does not matter and may be carried out simultaneously.

Figure 5:
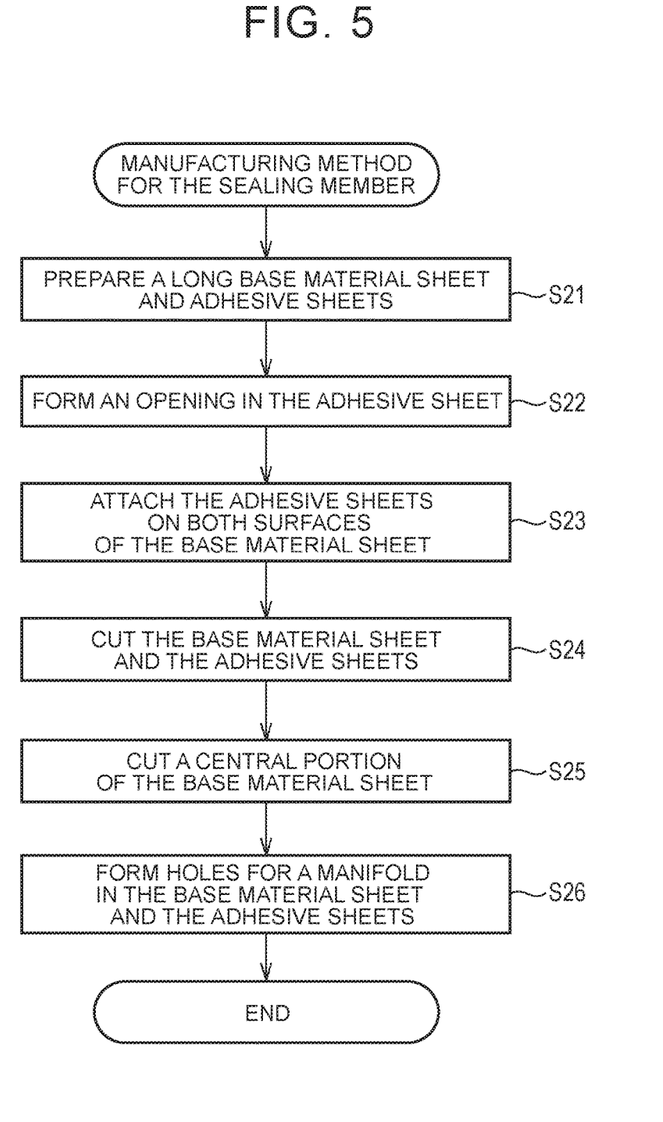
FIG. 5 is a flowchart showing a manufacturing method for a sealing member.
Figure 6A:
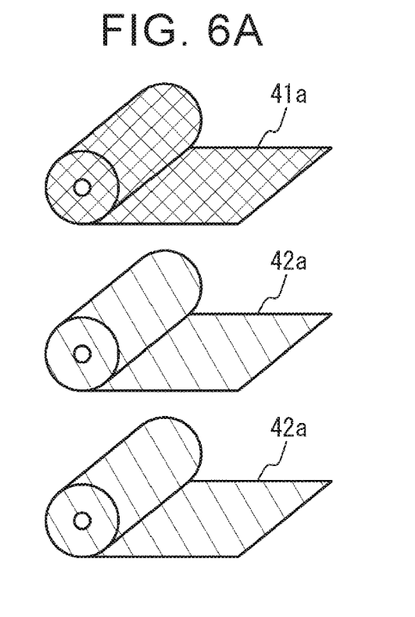
FIGS. 6A to 6C are explanatory views of the manufacturing method for the sealing member.

Next, a manufacturing method for the sealing member 40 is explained. FIG. 5 is a flowchart showing the manufacturing method for the sealing member 40. FIG. 6A to FIG. 6C, FIG. 7A and FIG. 7B are explanatory views of the manufacturing method for the sealing member 40. First of all, as shown in FIG. 6A, one base material sheet 41a having an elongated shape and two adhesive sheets 42a having elongated shapes are prepared (step S21). The base material sheet 41a and the adhesive sheets 42a are components of the base material 41 and the adhesive layers 42 of the manufactured sealing member 40, respectively. A material for the adhesive sheets 42a is thermoplastic resin, and, is, for example, polyester-based resin or modified olefin-based resin. The base material sheet 41a is an example of a base material 41 having an elongated shape. The adhesive sheets 42a are examples of the adhesive layers 42 having elongated shapes.

Figure 6B:
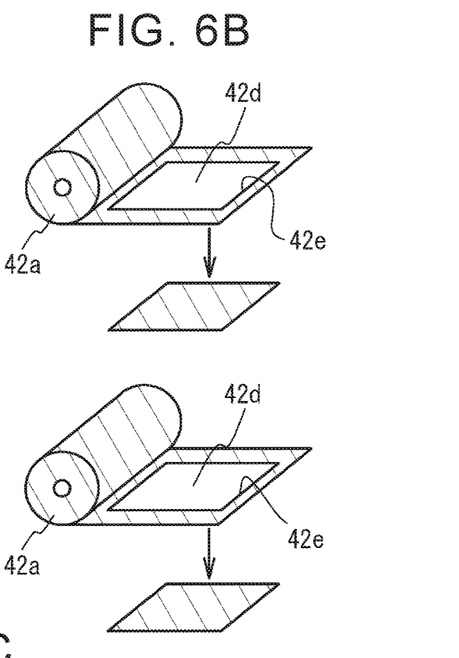

Next, as shown in FIG. 6B, in each of the two adhesive sheets 42a, rectangular openings 42d are formed along the longitudinal direction (step S22). An inner periphery 42e of the opening 42d corresponds to the inner periphery 42e of the adhesive layer 42 of the foregoing manufactured sealing member 40. Therefore, the opening 42d is formed so as to be larger than the electrolyte membrane 11. Further, the size and shape of the openings 42d are set in consideration of the positions of the adhesive layers 42 sandwiched between the separators 33a and 33c. To be more specific, the openings 42d are formed so as to have generally the same size and shape as those of the portions of the separators 33a and 33c where the anode flow passage 34a and the cathode flow passage 34c are formed.

Figure 6C:
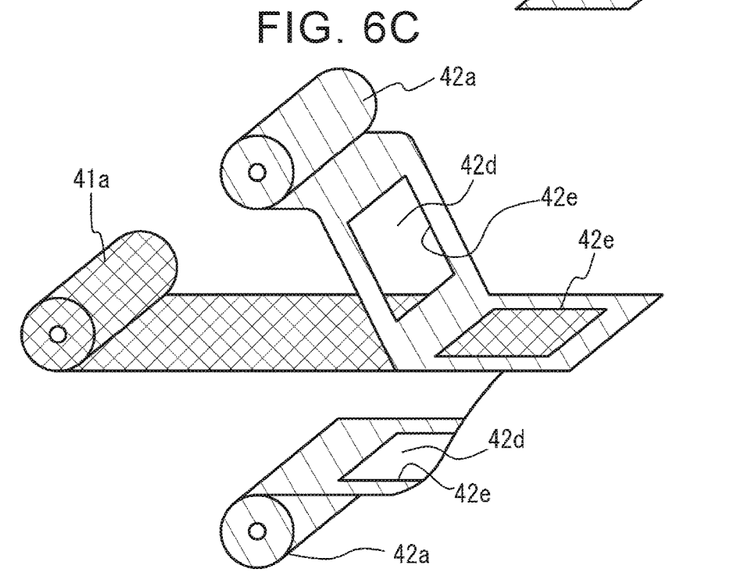

Next, as shown in FIG. 6C, the adhesive sheets 42a are attached to both surfaces of the base material sheet 41a, respectively, so that the positions of the inner peripheries 42e of the openings 42d match each other (step S23). To be more specific, the adhesive sheets 42a are attached to both surfaces of the base material sheet 41a by using, for example, a pressure roller while conveying the base material sheet 41a and the two adhesive sheets 42a by using a roller conveyor. In step S23, the adhesive sheets 42a may be attached to both surfaces of the base material sheet 41a simultaneously or one after the other.

Figure 7A:
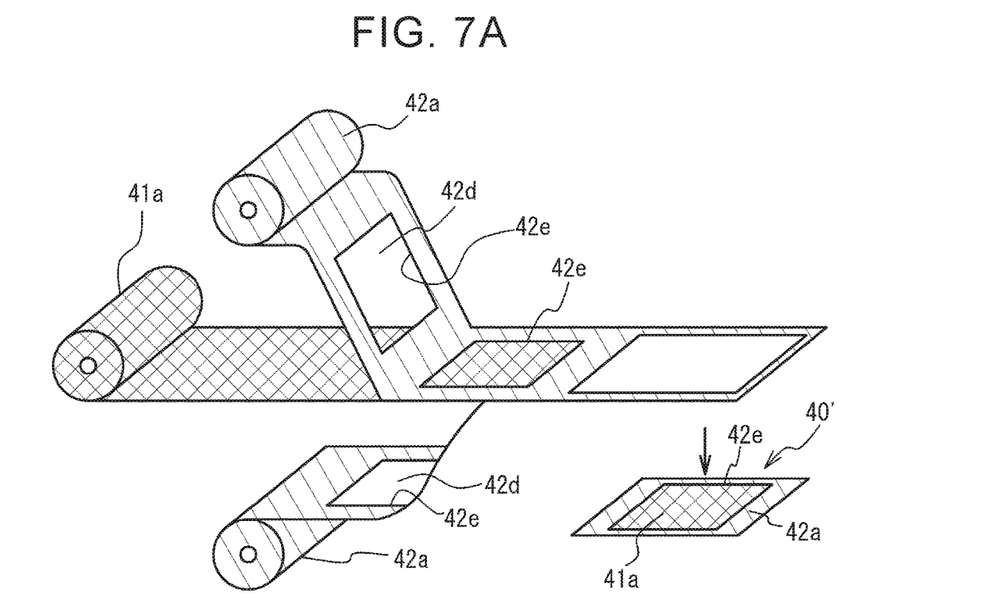
FIGS. 7A and B are explanatory views of the manufacturing method for the sealing member.

Next, as shown in FIG. 7A, the base material sheet 41a and the adhesive sheets 42a are cut into a generally rectangular shape on the outer side of the openings 42d so as to have generally the same size and shape as the shapes of the outer circumferences of the separators 33a and 33c (step S24). On this occasion, the base material sheet 41a and the adhesive sheets 42a are cut so that there is an enough space from the openings 42d to form the holes s1 to s6 for a manifold. FIG. 7A shows a cutout 40' after the cutting.

Next, in the cutout 40' that is cut out in step S24, a central portion of the base material sheet 41a, which is located at a position inwardly apart from the peripheries 42e of the openings 42d, is cut into a generally rectangular shape (step S25). In this occasion, the central portion, which is cut out form the base material sheet 41a, is cut out so as to have a shape that is smaller than the outer circumference shape of the peripheral area 11e of the electrolyte membrane 11 and larger than the outer circumference shape of the central area 11c, in other words, the catalyst layer 12c. Thus, the base material 41 is formed with a size that enables the inner periphery 41e side of the base material 41 to be arranged on top of the peripheral area 11e of the electrolyte membrane 11.

Figure 7B:
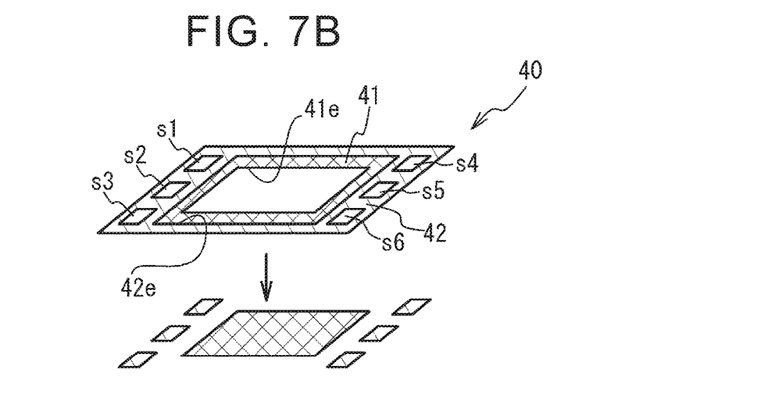

Next, the holes s1 to s6 for a manifold are formed by cutting the adhesive sheets 42a and the base material sheet 41a on the outer side of the openings 42d (step S26). In this way, the frame-shaped sealing member 40 is manufactured. Steps S24, S25, and S26 may be carried out in any order or simultaneously. By doing as stated above, the sealing member 40 is manufactured as shown in FIG. 7B, and the single cell 60, which restrains tension from being applied to the electrolyte membrane 11, is thus manufactured. The sealing member 40 in FIG. 7B is enlarged compared to the cutout 40' in FIG. 7A.

The preferred embodiment has been explained in detail so far. However, the disclosure is not limited to the specific embodiment, and various deformations and changes may be made without departing from the gist of the disclosure described in the scope of claims.

In the foregoing example, the anode-side catalyst layer 12a and the cathode-side catalyst layer 12c are illustrated as examples of the first and second catalyst layers, respectively, and the anode-side diffusion layer 22a and the cathode-side gas diffusion layer 22c are illustrated as examples of the first and second diffusion layers, respectively. However, the disclosure is not limited to those. The first and second catalyst layers may be a cathode-side catalyst layer and an anode-side catalyst layer, respectively, and the first and second diffusion layers may be a cathode-side gas diffusion layer and an anode-side gas diffusion layer, respectively.

What is claimed is:

1. A fuel cell comprising:
a membrane electrode gas diffusion layer assembly having an electrolyte membrane, a first catalyst layer disposed on one surface of the electrolyte membrane, a second catalyst layer disposed on the other surface of the electrolyte membrane so that a peripheral area of the electrolyte membrane is exposed, a first gas diffusion layer joined to the first catalyst layer, and a second gas diffusion layer joined to the second catalyst layer so that the peripheral area is exposed;
first and second separators that sandwich the membrane electrode gas diffusion layer assembly;
a sealing member having a resin-made and frame-shaped base material, a first adhesive layer that bonds one surface of the base material to the first separator, and a second adhesive layer that bonds the other surface of the base material to the second separator; and
an adhering portion that bonds an inner periphery side of the one surface of the base material to the peripheral area of the electrolyte membrane, wherein
the first and second adhesive layers are separated from the adhering portion in a plane direction of the electrolyte membrane, and disposed on an outside of the electrolyte membrane in the plane direction of the electrolyte membrane,
no other adhesive component than the adhering portion is provided in the base material between an inner periphery of the base material and the first and second adhesive layers in the plane direction of the electrolyte membrane, and
a linear expansion coefficient of the base material is smaller than any of those of the first and second adhesive layers.

2. The fuel cell according to claim 1, wherein the linear expansion coefficient of the base material is $57 \times 10^{-6}$/K or smaller.

3. The fuel cell according to claim 1, wherein the first and second adhesive layers are thermoplastic resin.

4. The fuel cell according to claim 1, wherein the second catalyst layer is formed so as to be aligned with one end portion of the electrolyte membrane.

5. A manufacturing method for a fuel cell comprising:
preparing a membrane electrode gas diffusion layer assembly having an electrolyte membrane, a first catalyst layer disposed on one surface of the electrolyte membrane, a second catalyst layer disposed on the other surface of the electrolyte membrane so that a peripheral area of the electrolyte membrane is exposed, a first gas diffusion layer joined to the first catalyst layer, and a second gas diffusion layer joined to the second catalyst layer so that the peripheral area is exposed;
preparing first and second separators;
manufacturing a sealing member having a resin-made and frame-shaped base material, and first and second adhesive layers provided on one surface and the other surface of the base material, respectively, in which the first and second adhesive layers are larger than the electrolyte membrane in a plane direction of the base material, no adhesive component is provided in the base material between an inner periphery of the base material and the first and second adhesive layers in the plane direction of the base material, and a linear expansion coefficient of the base material is smaller than any of those of the first and second adhesive layers;
bonding an inner periphery side of the one surface of the base material to the peripheral area of the electrolyte membrane by using an adhesive so that the first and second adhesive layers are separated from the electrolyte membrane in the plane direction of the electrolyte membrane; and
bonding the membrane electrode gas diffusion layer assembly and the sealing member to the first and second separators by using the first and second adhesive layers, respectively, while causing the first and second separators to sandwich the membrane electrode gas diffusion layer assembly and the sealing member.

6. The manufacturing method for a fuel cell according to claim 5, wherein,
when manufacturing the sealing member,
the base material having an elongated shape and the first and second adhesive layers having elongated shapes, respectively, are prepared,
an opening larger than the electrolyte membrane is formed in each of the first and second adhesive layers,
the first and second adhesive layers attached to the one surface and the other surface of the base material, respectively, so that positions of the openings match each other,
the base material is cut together with the first and second adhesive layers into a rectangular shape at a position on an outer side of the openings,
a central portion of the base material is cut at a position inwardly apart from peripheries of the openings into a shape that is smaller than an outer circumference of the peripheral area of the electrolyte membrane and larger than the second catalyst layer, and a hole for a manifold is formed on the outer side of the openings.

\* \* \* \* \*